March 31, 1970
TAKESHI SHIMODA
3,503,902
METHOD FOR PRODUCING TEMPERATURE SENSITIVE RESISTOR
COMPRISING VANADIUM OXIDE
Filed Sept. 12, 1967
3 Sheets-Sheet 1
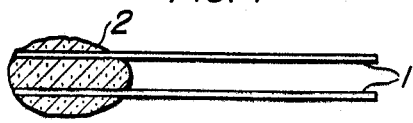
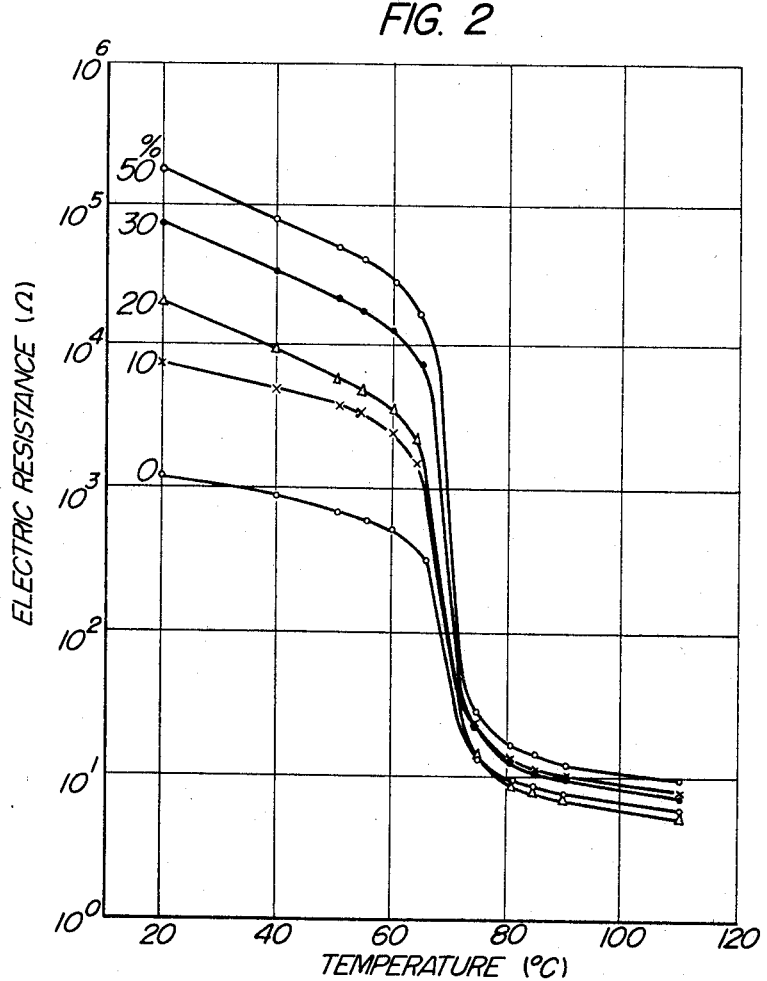
INVENTOR
TAKESHI SHIMODA
BY Craig & Antonelli
ATTORNEYS Wo: CONTENT OF MOLTEN POWDERS (g)
Wt: TOTAL WEIGHT OF MIXED POWDERS (g)

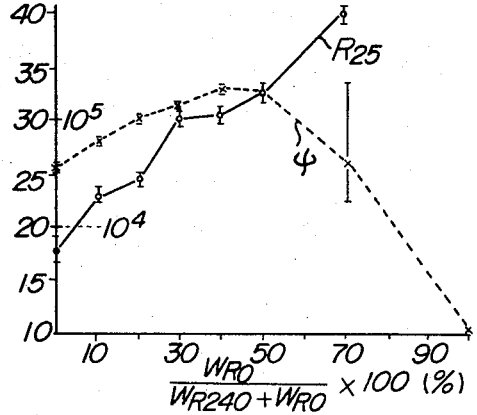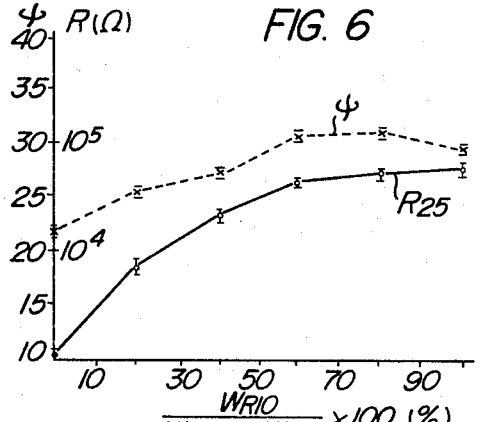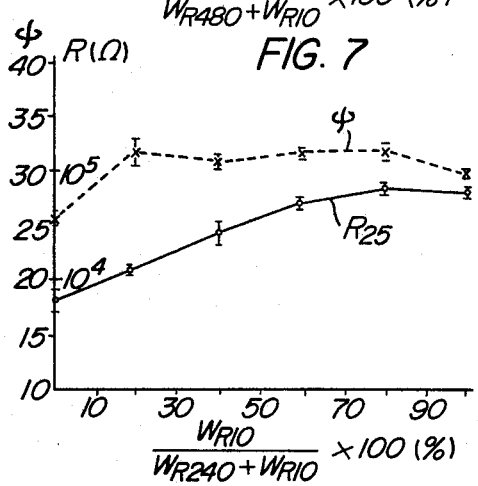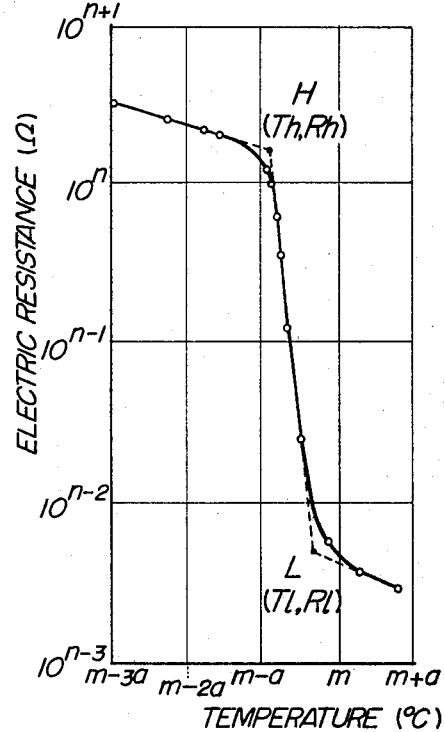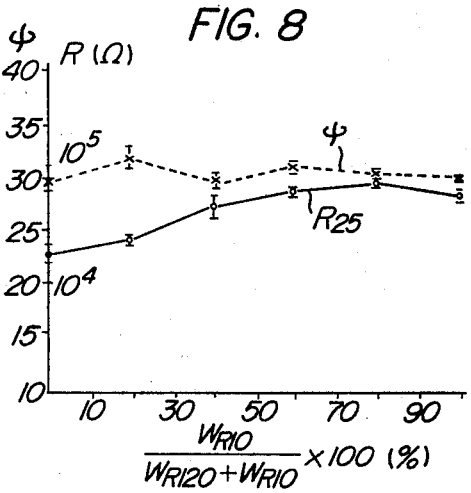

United States Patent Office 3,503,902
Patented Mar. 31, 1970

3,503,902
METHOD FOR PRODUCING TEMPERATURE SENSITIVE RESISTOR COMPRISING VANADIUM OXIDE
Takeshi Shimoda, Hachioji-shi, Japan, assignor to Hitachi, Ltd., Tokyo, Japan, a corporation of Japan
Filed Sept. 12, 1967, Ser. No. 667,179
Claims priority, application Japan, Sept. 14, 1966, 41/60,356
Int. Cl. H01b 1/08; H01c 7/04
U.S. Cl. 252—517          20 Claims

ABSTRACT OF THE DISCLOSURE

A method for fabricating a temperature sensitive resistor having a high negative temperature coefficient of resistance across a particular temperature range comprising the steps of: heating a first mixture including $V_2O_5$ and other oxide such as $P_2O_5$, SrO, PbO etc., in a reducing atmosphere to reduce $V_2O_5$ at about 400° C. to low valence vanadium oxide; adding a second material of vanadium oxide and another oxide such as $P_2O_5$, SrO, PbO, etc., or merely said other oxide to said reduced first mixture; forming the resulting mixture into a desired shape; and sintering the shaped material at a temperature of from 900–1,300° C. in an inert atmosphere.

---

This invention relates to a method for producing a thermistor or a thermally sensitive resistor having a large negative temperature coefficient of resistance in a particular temperature range.

A thermistor of which resistance abruptly decreases in a particular temperature range and which comprises oxide semiconductor materials mainly composed of vanadium oxide was shown in U.S. Ser. No. 484,510, now abandoned, which is a continuation-in-part of abandoned application Ser. No. 266,245, or U.S. Ser. No. 475,129, now patented as Patent No. 3,402,131. Said thermistor comprises a sintered body where a large amount of microcrystals of $VO_2$ is suspended in a semiconductive oxide flux and has a very high stability of electrical characteristics as compared to a thermistor which is produced from single crystal body of $VO_2$.

In said applications, said thermistor is produced by the following method. That is, a mixture of vanadium pentoxide $V_2O_5$ and other oxide ($P_2O_5$, BaO, SrO, PbO, etc.) is crushed and this powdered mixture is heated at a temperature in the neighborhood of about 400° C. in a reducing atmosphere to reduce $V_2O_5$. This heating should be effected in such a manner that the mean value of oxygen/vanadium ratio of vanadium oxide contained in said reduced mixture is between the true stoichiometric values of $V_2O_5$ and $V_2O_4$. Then, said reduced mixture is formed into a desired shape and thereafter the shaped mixture is sintered at a temperature of 1000° C.–1300° C. in an inert atmosphere. This sintering treatment results in the separation of microcrystals of $VO_2$ in the oxide mixture. The sintered body is immediately taken out of the sintering furnace and is rapidly cooled to obtain said thermistor.

However, said method has disadvantages to be overcome on reproducibility of electrical characteristics and yield.

Accordingly, an object of the invention is to provide an improved method of producing oxide semiconductive materials having a high temperature coefficient of the resistance in a particular temperature range.

Another object of the invention is to provide a method of making a thermistor of which resistance changes abruptly at a particular temperature range, which offers good reproducibility and uniformity of electrical characteristics, and is suitable for mass production.

Other objects and features of the invention will become more apparent from the detailed description taking place hereinafter in connection with the accompanying drawings, wherein;

FIG. 1 is a partial cross sectional view of a bead type thermistor.

FIG. 2 is an electrical resistance-temperature characteristics curve of an oxide resistor produced by the method of this invention.

FIG. 4 is an electrical resistance-temperature characteristic curve of a particular thermistor for the explanation of this invention.

FIGS. 5–8 are graphs which show the electrical characteristics $\psi$ and resistance $R_{25}$ of the oxide resistors produced by the method of one embodiment of this invention in which the conditions of reduction are variously changed.

Figure 3:
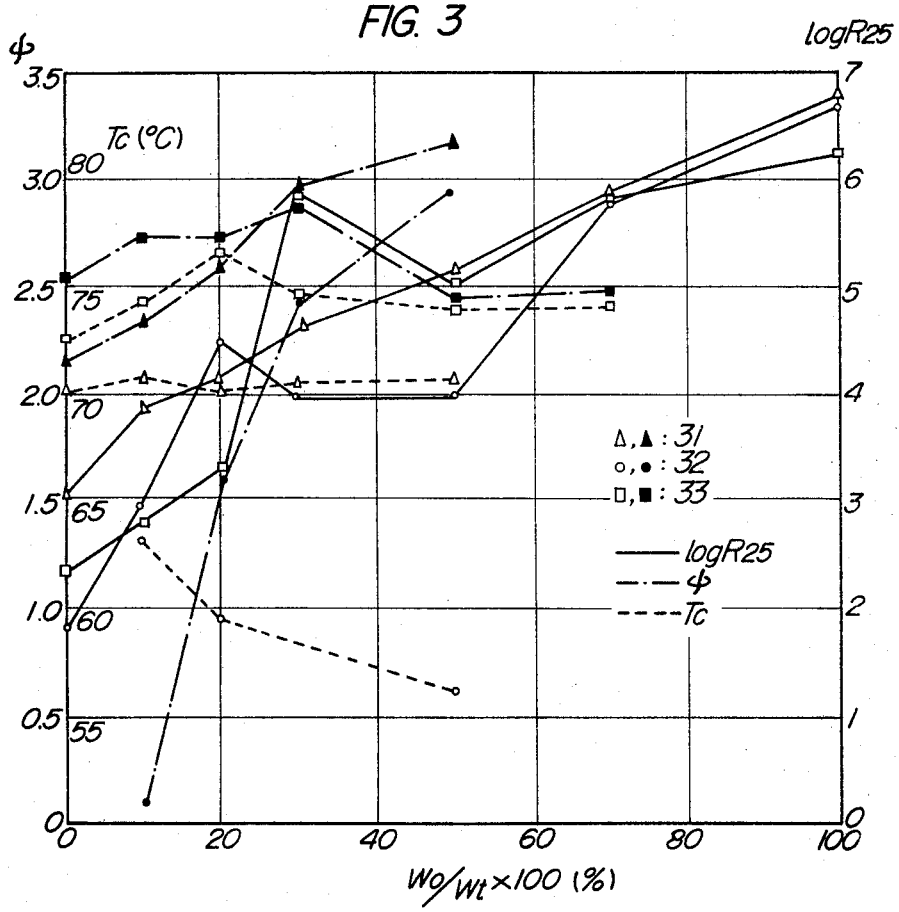
FIG. 3 is a diagram showing the change of the electrical characteristics of the oxide resistors produced by the method of this invention, depending upon the mixing ratio of components.

One embodiment of this invention includes the following steps; melting a mixture of $V_2O_5$ and another oxide such as $P_2O_5$, PbO, BaO, SrO, etc., at about 1000° C. in the air; cooling said melted oxide mixture or complex oxide mixture; crushing said cooled oxide mixture or complex oxide mixture; heating said crushed mixture in $NH_3$ at about 400° C. to reduce $V_2O_5$; again adding a mixture of $V_2O_5$ and said other oxide to said reduced body; and sintering the resulted mixture at a temperature of higher than 1000° C.

The above mentioned term "complex oxide" is used in this specification to include nonstoichiometric oxide, e.g., a low valent vanadium oxide.

According to another embodiment, to the reduced mixture of $V_2O_5$ and said another oxide, only other oxide such as $P_2O_5$, PbO, etc., is added and resulted mixture is sintered.

According to still another embodiment, to the reduced mixture, a second mixture of $V_2O_5$ and said other oxide subjected to the milder reduction treatment than said reduced mixture is added and the resulting mixture is sintered.

This invention is illustrated in the following examples.

EXAMPLE 1

$V_2O_5$, $SrCO_3$ and $(NH_4)_2HPO_4$ were weighed and mixed in such a manner as the atomic ratio of V:Sr:P is 7.1:1.8:1.1 to produce a mixture the total weight of which is 100 g. The mixture was transferred to a porcelain crucible and fired at about 500° C. for about 30 minutes in the air. Thereafter, the temperature of the mixture was raised to about 1000° C. and the mixture was melted by maintaining it at this temperature for about one hour and cooled to produce cullet of glassy oxide.

Said firing of the mixture at about 500° C. is effected to prevent the evaporation of $P_2O_5$ and simultaneously to decomposed ammonium salt. SrO easily reacts with $CO_2$ and $P_2O_5$ and is hygroscopic. Therefore, when SrO or $P_2O_5$ is employed, exact weighing of the mixture is difficult because the weight thereof changes during the weighing. Accordingly, the stable compound such as $SrCO_3$ or $(NH_4)_2HPO_4$ is used as a starting material in place of SrO or $P_2O_5$. The former compounds decompose during the heat treatment into SrO, $P_2O_5$ or complex oxide thereof. Therefore, the cullet after the heat treatment is a glass body containing $V_2O_5$, SrO and $P_2O_5$.

Next, said cullet was crushed into powder. A portion of the powder was extracted and reduced at about 400° C. for about 4 hours in ammonia $NH_3$ gas in a quartz boat. This reduction treatment is effected to reduce $V_2O_5$ and the mean value of oxygen/vanadium ratio of vanadium oxide contained in the reduced mixture is less than the true stoichiometric value (5/2) of $V_2O_5$. However, the reaction of reduction of $V_2O_5$ at about 400° C. in $NH_3$ discontinues when $V_2O_5$ is converted into $V_2O_4$ and in this case, the mean value of oxygen/vanadium ratio of vanadium oxide is not less than the true stoichiometric value of $V_2O_4$. In general, alcohol ($CH_3OH$, $C_2H_5OH$, etc.), benezene ($C_6H_6$), hydrogen ($H_2$), etc., may be used besides said amomnia ($NH_3$) as the reducing gas, and it is necessary to control the treating temperature, time and gas concentration depending upon the employed gas because gases have different reducibility (i.e., velocity or power, etc.). A temperature of 300°–400° C. is suitable for ammonia gas. It is preferable for the uniform reduction of material to keep it in powder form during the reduction treatment. For that purpose, the reducing temperature should preferably be kept lower than the melting point or softening temperature of the powdered mixture.

Then, a portion of this highly reduced powder and a portion of the remaining (unreduced powder) of said melted and crushed powder were mixed at a given mixing ratio to produce powder having the total weight of 1 g. In this way, several kinds of powder having different mixing ratio were produced. Care should be given in the mixing process lest the mean value of oxygen/vanadium ratio of vanadium oxide contained in the compound of reduced powder and unreduced powder should be less than that of $V_2O_4$. In other words, if the vanadium oxide contained in said mixture is designated as $V_2O_x$, the control should be effected to obtain $5 > X \geq 4$. (In general, vanadium oxide designated as $V_2O_x$ ($0 < X < 5$) is called a low valence vanadium.)

Under said reduction conditions, that is, at about 400° C. in $NH_3$ gas, $V_2O_5$ is not reduced to $V_2O_3$ and therefore the above mentioned care is unnecessary. However, when $H_2$ is used as the reducing atmosphere, $V_2O_5$ is reduced to $V_2O_3$ and it is expected that the mean value of oxygen/vanadium of vanadium oxide contained in the reduced mixture becomes lower than that of $V_2O_4$ depending upon the reduction period. In this case, therefore, said care should be given.

Then, each mixed powder was made pasty with water as a binder. This pasty mixture was applied between a pair of Pd or Pt lead wires and thereafter naturally dried and shaped. The shaped mixture was sintered at about 1000° C. for about 3 minutes in $N_2$ gas. Thereafter, the sintered body was immediately taken out of the sintering furnace and was cooled to the normal temperature. Melting or deformation during the sintering occurred in a less degree as compared to the conventional technique. The atmosphere outside the furnace is preferably an inert gas. Said sintering step is necessary to separate microcrystals of $VO_2$ in the mixture and the temperature for sintering should be higher than 800° C. but lower than the melting point of $VO_2$ microcrystals. Especially preferred temperature is 900°–1300° C.

Said rapid cooling is effected to fix the $VO_2$ microcrystal in the oxide mixture as it is. FIG. 1 shows a resistor or thermistor produced according to the above procedure, in which (1) indicates lead wires and (2) indicates the sintered body having such a construction as a large amount of crystalline vanadium dioxide $VO_2$ is suspended in the glassy oxide material.

FIG. 2 shows the results of measurement of electrical resistance-temperature characteristics of each sintered body produced as mentioned above. In this figure, the percentage shows the content proportion of said unreduced powder (mixture of $V_2O_5$, SrO and $P_2O_5$). From this figure, it is recognized that the resistance becomes higher with increase of the addition amount of said melted and unreduced powder. In order to make this fact clearer, changes of $\psi$, $T_c$ and log $R_{25}$ depending upon the mixing ratio of said unreduced powder and the reduced powder are shown by the broken line indicated as 31 in FIGURE 3. The relation between log $R_{25}$ and $W_o/W_t$ ratio [$W_o$: content (gr.) of the melted powder (unreduced powder), $W_t$: the total weight (gr.) of mixed powder (the total weight of the reduced and unreduced powders)] is neatly linear. Said $\psi$, $T_c$ and log $R_{25}$ are defined as below. That is, when in the resistance and temperature characteristic curve of the oxide resistor produced by this method as shown in FIG. 4, the temperature and resistance at abruptly changing point H on the lower temperature side are designated as $Th$ and $Rh$, respectively, and the temperature and the resistance at abruptly changing point L on the higher temperature side are $Tl$ and $Tl$, respectively, value ($\psi$) which shows the degree of abrupt change of resistance and the middle point ($T_c$) of the temperature at which the resistance abruptly changes can be defined as follows:

$$\psi = \log 10 \frac{Rh}{Rl}, \quad T_c = \frac{Th + Tl}{2}$$

$R_{25}$ is the resistance of the thermistor at 25° C. and log $R_{25}$ is the logarithmic resistance of $R_{25}$ to the base 10.

As explained above, according to one embodiment of this invention, $T_c$ is uniform almost regardless of the mixing ratio and $\psi$ is more than 2.5 for the resistor having $10^4 \sim 10^6 \Omega$ which is particularly required for practical use. Said example deals with the bead type thermistor as shown in FIG. 1, but other shape, e.g., disc type can be employed and the shape of the thermistor has no substantial significance.

EXAMPLE 2

$V_2O_5$, $(NH_4)_2HPO_4$ and $Fe_2O_3$ were mixed in such a manner as the atomic ratio of V:Fe:P is 5.0:2.5:2.5 ($T_c \simeq 57°$ C.) and $V_2O_5$, $(NH_4)_2HPO_4$, $SrCO_3$, $Fe_2O_3$, $GeO_2$ and $Bi_2O_3$ were mixed in such a manner as the atomic ratio of V+Ge:P:Sr:Bi is 7.64:1.04:0.72:0.60 ($T_c \simeq 76°$ C.). In this case, the mixing of $V_2O_5$ and $GeO_2$ was effected so that the atomic ratio of V:Ge is 9.37:0.36. The subsequent treating steps were the same as in Example 1. The results obtained are shown by the broken lines designated as 32 and 33 in FIG. 3, respectively. The relation between $Wo/Wt$ ratio and log $R_{25}$ is complicated as compared to that of Example 1. However, when the graph such as FIG. 3 is previously produced, the thermistors having any resistance can be easily obtained as in Example 1.

EXAMPLE 3

A raw material having the same compositions as in Example 1 was prepared. This was melted, solidified and crushed. A portion of thus obtained powder was reduced at various reduction degree. That is, 5 samples were reduced at 400° C. in $NH_3$ gas for 0, 10, 120, 240, 480 minutes, respectively. Thereafter, the samples were subjected to shaping and sintering treatments as in Example 1. Results of measurement on the thermistors obtained are shown in FIGS. 5–8, in which $W_{R0}$, $W_{R10}$, $W_{R120}$, $W_{R240}$ and $W_{R480}$ indicate the weight of powder reduced for 0, 10, 120, 240, 480 minutes, respectively, as mentioned above. FIG. 5 relates to a thermistor produced by adding unreduced powder to the powder reduced for 240 minutes and shows that the same results as in FIG. 3 were obtained. However, the reduction degree on $W_{R240}$ is smaller than on $W_{R480}$ and hence the resistance of the former is higher. FIGS. 6–8 relate to thermistors using powder reduced for 10 minutes in place of the unreduced powder and the other powder reduced for 480, 240 and 120 minutes, respectively. Relation between the content of $W_{R10}$ and $R_{25}$ is in the smaller inclination than in FIGS. 3 and 5. Therefore, the thermistor having the desired resistance can be obtained with higher accuracy. The important point in FIGS. 5–8 is that in FIG. 5, when the mixing amount of reduced powder is more than 70%, the value of $\psi$ is considerably fluctuating, while when less than 70%, the degree of fluctuation is very small and highly excellent reproducibility is obtained. In effect, oxide resistor having any electrical characteristics can be obtained by using FIGS. 5–8. The same thing can be applied to FIG. 3. This fact is very convenient for mass production of a thermistor.

EXAMPLE 4

A powder mixture containing $V_2O_5$ and other oxide was reduced under the same conditions as in Example 1. The oxides such as $P_2O_5$, SrO, etc., free from $V_2O_5$ was mixed with said reduced powder and the resultant mixture was shaped and sintered under the same conditions as in Example 1. The same good results as in Example 1 were obtained. In this case, said other oxides to be mixed with the reduced powder contain no $V_2O_5$ and hence the reduction of starting material should be effected in such a manner as the mean value of oxygen/vanadium ratio of vanadium oxide contained in said starting material is not less than that of $VO_2$ (or $V_2O_4$).

As said other oxides mixed with $V_2O_5$ in the above each example, besides above mentioned oxide of phosphor, P; barium, Ba; strontium, Sr; lead, Pb; iron, Fe; germanium, Ge; or bismuth, Bi; the following oxide can be used alone or in suitable combination thereof: oxide of silver, Ag; lithium, Li; sodium, Na; potassium, K; beryllium, Be; magnesium, Mg; calcium, Ca; lanthanum, La; cerium, Ce; zirconium, Zr; zinc, Zn; cadmium, Cd; boron, B; aluminum, Al; silicon, Si; tin, Sn; uranium, U; yttrium, Y; cobalt, Co; nickel, Ni; manganese, Mn; titanium, Ti; niobium, Nb; tungsten, W; molybdenum, Mo; tantalum, Ta; chromium, Cr; etc. Among these, oxides of P, Ba, Sr, Pb, Ag, Fe and Ge are particularly preferable materials.

In this invention, it is preferable that vanadium oxide is contained in the starting material at an atomic ratio of more than 70% of elements except for oxygen. Furthermore, the finished product has such a construction as much fine particle of crystalline vanadium dioxide $VO_2$ is suspended in flux comprising mixture oxide and each particle is wrapped by the flux. In order to obtain a given electrical characteristic in such a construction, it is desirable that 4 valence vanadium is contained at least 5% at an atomic ratio. This amount can be easily controlled by changing the reduction degree of the starting material and the amount of the oxide substance added to the reduced material.

I claim:

1. A method for making a temperature sensitive resistor comprising the steps of:
   preparing a first material including oxides of at least 5% of vanadium in an atomic ratio of elements other than oxygen included therein, the mean value of the oxygen/vanadium ratio of said oxides of vanadium being below 5/2 but not less than 4/2;
   adding a second material to said first material, said second material including at least one oxide selected from the group consisting of oxides of vanadium, phosphorus, strontium, barium, lead, silver, lithium, sodium, potassium, beryllium, magnesium, calcium, lanthanum, cerium, zirconium, zinc, cadmium, boron, aluminum, silicon, tin, bismuth, uranium, ytterium, germanium, iron, cobalt, nickel, manganese, titanium, niobium, tungsten, molybdenum, tantalum, and chromium; and
   sintering the resulted mixture in at inert atmosphere.

2. A method as defined in claim 1, wherein said sintering is performed at a temperature more than 800° C. but not exceeding the melting point of crystalline vanadium dioxide $VO_2$ in an inert atmosphere.

3. A method as defined in claim 1, wherein said oxide material includes vanadium oxide the mean value of the oxygen/vanadium ratio being more than that of the vanadium oxide included in said starting mixture.

4. A method for fabricating a temperature sensitive resistor comprising the steps of:
   heating a first oxide material including pentoxide of at least 5% of vanadium in an atomic ratio of elements other than oxygen included therein in a reducing atmosphere;
   adding a second oxide substance to the reduced first oxide material, said second oxide material including at least one oxide selected from the group consisting of oxides of vanadium, phosphorus, strontium, barium, lead, silver, lithium, sodium, potassium, beryllium, magnesium, calcium, lanthanum, cerium, zirconium, zinc, cadmium, boron, aluminum, silicon, tin, bismuth, uranium, yttrium, germanium, iron, cobalt, nickel, manganese, titanium, niobium, tungsten, molybdenum, tantalum and chromium;
   forming the resulted mixture into a desired shape; and
   sintering the shaped mixture.

5. A method as defined in claim 4, wherein said first oxide material further includes at least one oxide selected from the group consisting of oxides of phosphor, strontium, barium, lead, silver, lithium, sodium, potassium, beryllium, magnesium, calcium, lanthanum, cerium, zirconium, zinc, cadmium, boron, aluminum, silicon, tin, bismuth, uranium, yttrium, germanium, iron, cobalt, nickel, manganese, titanium, niobium, tungsten, molybdenum, tantalum and chromium.

6. A method as defined in claim 4, wherein said heating in a reducing atmosphere is performed at a temperature of not more than 400° C.

7. A method as defined in claim 4, wherein said second oxide material includes vanadium oxide, the mean value of oxygen/vanadium ratio being more than 4/2.

8. A method as defined in claim 4, wherein said second oxide material includes vanadium oxide the mean value of oxygen/vanadium ratio being more than that of the vanadium oxide included in said reduced first oxide material.

9. A method as defined in claim 4, wherein said reducing atmosphere includes one of ammonia, benzene and alcohol.

10. A method for making a thermistor comprising the steps of:
    preparing a first mixture including vanadium pentoxide containing at least 5% of vanadium in an atomic ratio of elements other than oxygen: and the balance being at least one oxide selected from the group consisting of oxides of phosphorus, strontium, barium, lead, silver, lithium, sodium, potassium, beryllium, magnesium, calcium, lanthanium, cerium, zirconium, zinc, cadmium, boron, aluminum, silicon, tin, bismuth, uranium, yttrium, germanium, iron, cobalt, nickel, manganese, titanium, niobium, tungsten, molybdenum, tantalum, and chromium; pulverizing said first mixture into a powder; heating the powdered first mixture in a reducing atmosphere at a temperature of not more than 400° C.; adding to said reduced first mixture a second mixture including vanadium oxide and at least one oxide selected from said group, in such a manner that the mean value of the oxygen/vanadium ratio of the vanadium oxide included in the resulted mixture is not less than 4/2; forming the resulted mixture into a desired shape; and firing the shaped mixture in an inert atmosphere at a temperature more than 800° C. but less than the melting point of crystalline vanadium dioxide $VO_2$.

11. A method as defined in claim 10, wherein said steps further includes a step of immediately taking the fire mixture out of firing furnace to cool said fired mixture immediately.

12. A method according to claim 10, wherein said first mixture includes pentoxide of not less than 70% of vanadium in atomic ratio of elements other than oxygen.

13. A method according to claim 10, wherein the step of firing the shaped mixture is carried out at a temperature of from 900° C. to 1300° C.

14. A method according to claim 10, wherein the step of firing the shaped mixture is carried out for about 3 minutes.

15. A method for producing temperature sensitive resistors which comprises:
melting a first material of vanadium oxides and at least one other oxide, selected from the groups consisting of phosphorus, strontium, barium, lead, silver, lithium, sodium, potassium, beryllium, magnesium, calcium, lanthanum, cerium, zirconium, zinc, cadmium, boron, aluminum, silicon, tin, bismuth, uranium, yttrium, germanium, iron, cobalt, nickel, manganese, titantium, nobium, tungsten, molybdenum, tantalum, and chromium; said vanadium oxides being present in an atomic ratio of at least 5% of the total elements present other than oxygen, cooling said oxide mixture, heating said cooled oxide mixture in a reducing atmosphere at a temperature not exceeding about 400° C., the mean value of the oxygen/vanadium ratio of said oxides of vanadium being less than 5/2 but not less than 4/2, adding to said first material a second material containing at least one additional oxide selected from said group and sintering the resulting mixture in an inert atmosphere.

16. The method of claim 15 wherein said second material also contains vanadium oxide.

17. The method of claim 15 wherein the second material contains vanadium oxide and said other oxide which have been subjected to a milder reduction treatment relative to said reduced mixture.

18. The method of claim 15 wherein reducing atmosphere is selected from the group consisting of methanol, ethanol, benzene and ammonia gas.

19. The method of claim 15 wherein the reducing temperature is about 300–400° C.

20. The method of claim 15 wherein the other oxide is selected from the group consisting of phosphorus, barium, strontium, lead, silver, iron and germanium.

References Cited
UNITED STATES PATENTS 3,402,131   9/1968   Futaki et al. _____ 252—512

OTHER REFERENCES

Chemical Abstracts, vol. 47, 1953, col. 1910.

BENJAMIN R. PADGETT, Primary Examiner

U.S. Cl. X.R.

252—518, 519, 520, 521; 338—22